United States Patent [19]

Workman, Jr.

[11] 3,739,659
[45] June 19, 1973

[54] AUTOMATIC SPEED SHIFT FOR POWER TOOL
[75] Inventor: William Workman, Jr., Spring Lake, Mich.
[73] Assignee: Gardner-Denver Company, Quincy, Ill.
[22] Filed: Dec. 30, 1971
[21] Appl. No.: 213,970

[52] U.S. Cl. .................... 74/751, 192/56, 173/12, 81/52.4, 81/57.14
[51] Int. Cl. ...... F16h 3/74, B23q 5/36, F16d 43/20
[58] Field of Search .......................... 74/750, 751; 81/52.4, 57.14; 173/12; 192/56

[56] References Cited
UNITED STATES PATENTS
3,610,343  10/1971  Bratt ..................................... 173/12
3,059,620  10/1962  Eckman ............................ 81/52.4 R
3,187,860  6/1965  Simmons ............................ 74/751 X
3,430,521  3/1969  Kulman ............................. 74/750 R
3,507,173  4/1970  Wallace .............................. 81/52.4

Primary Examiner—Arthur T. McKeon
Attorney—M. E. Martin

[57] ABSTRACT

A two-speed shift device for a power tool such as a wrench or nutsetter comprising a planetary gear set having a planet gear carrier connected to the driven member of a torque responsive clutch and a ring gear mounted in a one-way clutch for unidirectional rotation. The driving member of the torque responsive clutch comprises a piston which is axially movable to uncover a pressure fluid port in response to a predetermined torque to cause pressure fluid to disengage the torque clutch to provide for the planetary gear set to become operative to reduce the output speed of the tool.

9 Claims, 5 Drawing Figures

AUTOMATIC SPEED SHIFT FOR POWER TOOL

BACKGROUND OF THE INVENTION

In the art of rotary power tools for tightening threaded fasteners it is desirable to operate the tool at high speed during the relatively free running portion of the tool operating cycle before the fastener strongly resists rotation, and then operate the tool at low speed during the final tightening process in order to produce a desired final torque on the fastener. Known devices for producing the abovementioned operating cycle of a power wrench or nutsetter include apparatus such as that disclosed in the U.S. Pat. No. 3,430,521 to M.L. Kulman wherein two separate disengaging type clutch devices operate to change the tool output spindle speed by disengaging the output spindle from a driving spindle and connecting the output spindle to a rotating gear carrier of a planetary gear set. Known devices also include the apparatus disclosed in U.S. Pat. No. 3,610,343 to S.A. Bratt wherein a ring gear of a planetary gear set comprises an axially movable clutch member operable in response to a pressure fluid signal to be locked in a nonrotative condition to effect a change in the output speed of a tool.

Disadvantages of known speed shifting mechanisms for power tools include the problem of rapid wear and frequent breakage of clutch and other tool parts caused by forcible engagement of cooperating clutch members at high relative speeds of rotation. Moreover, some types of speed shifting devices for power tools such as nutsetters do not provide for remote control of the speed shifting operation. Remote control of speed shift is particularly desirable for arrangements of plural tools wherein it is usually advantageous to provide for all tools to tighten their respective fasteners a predetermined amount before the final tightening operation is performed to assure proper alignment of the members being joined together.

SUMMARY OF THE INVENTION

The present invention provides for an improved automatic speed shifting device for a power tool such as a nutsetter or the like in which a torque responsive clutch operates to disengage driving and driven clutch members to effect a change in the rotary output speed of a planetary gear set. With the speed shift device of the present invention a torque responsive clutch is rapidly and positively disengaged to effect a speed change in a tool output spindle. Rapid and positive clutch disengagement is effected by pressure fluid and accidental reengagement of the clutch under load is substantially prevented. The present invention further provides a speed shift device for a nutsetter or the like which is readily adapted to remote control of shifting from high speed to low speed whereby plural nutsetter units using the speed shifting device of the present invention may be operated to produce uniform clamping force of a mechanical joint having a plurality of fasteners. The present invention also provides for a speed shift device for a power tool which operates to change from a relatively high speed to a low speed without imparting severe shock loads on the tool drive members and without causing the rapid engagement of two members rotating at considerably different speeds. The present invention further provides for a speed shift device using a torque responsive clutch disengageable by pressure fluid and operating in combination with a one-way clutch for effecting speed shift.

DESCRIPTION OF THE PREFERRED EMBODIMENT

Figure 1:
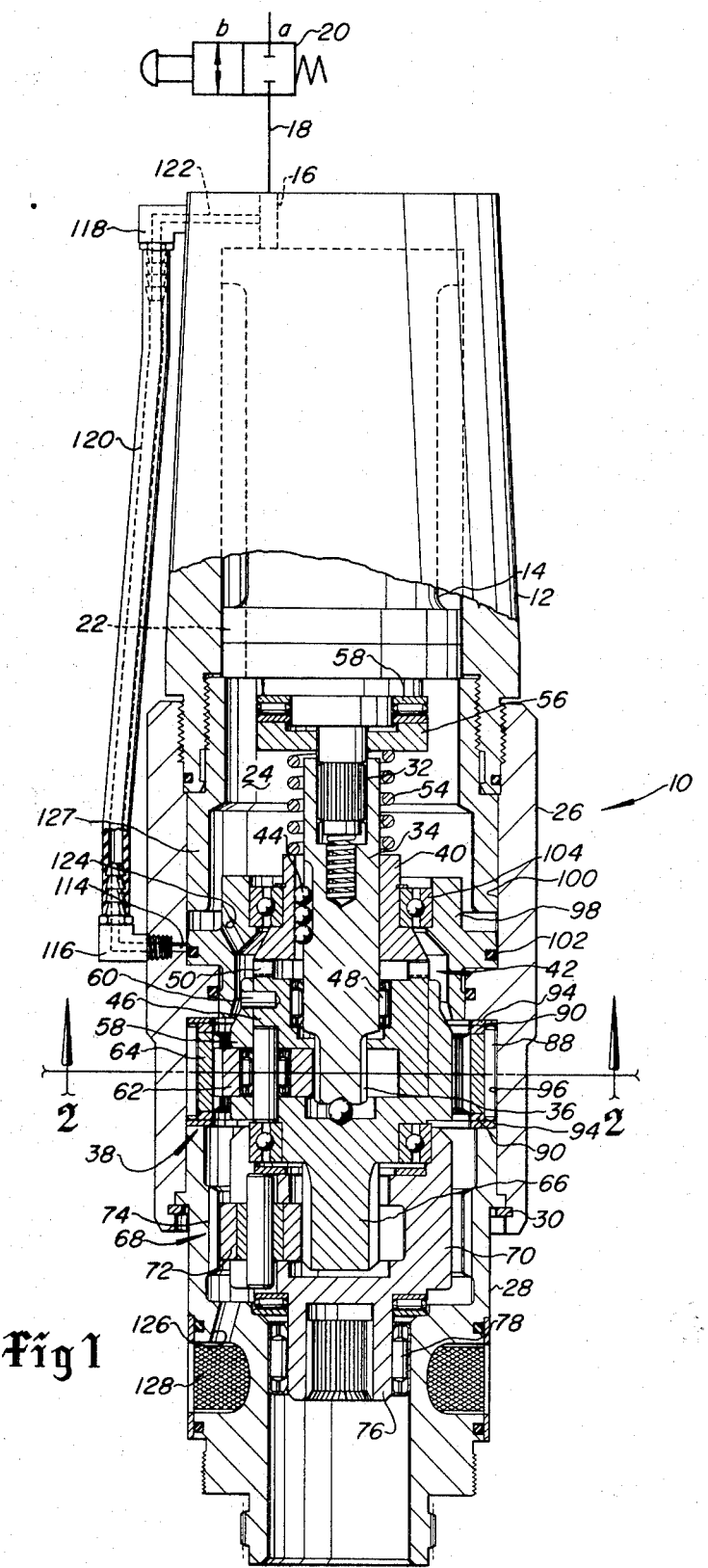
FIG. 1 is a longitudinal section view of a power tool including the speed shift device of the present invention.

Referring to the drawing and in particular FIG. 1, a pressure fluid operated power tool is illustrated in part and generally designated by the numeral 10. The tool 10 is of a type generally well known for use in tightening threaded fasteners and commonly referred to as nutsetters or nutrunners. The portion of the tool 10 illustrated may be interchangeably used as a hand-held wrench or mounted on a frame together with additional tool units to be used for tightening a plurality of fasteners simultaneously. Modifications necessary to provide for the different modes of use are well known to those skilled in the art and will not be discussed further herein.

The tool 10 includes a casing 12 in which is located a pressure fluid operated motor 14 of the rotary vane type. The motor 14 is supplied with pressure fluid such as compressed air through a passage 16 which is connected to a supply conduit 18. A suitable valve 20 having a blocked position $a$ and an open position $b$ is interposed in the conduit 18 for controlling the supply of pressure fluid to the motor 14. Spent motive fluid is exhausted from the motor 14 by way of a passage 22 into the interior 24 of the casing 12. The casing 12 also comprises a portion 26 threadedly engaged thereto and a third portion 28 suitably retained in engagement with the portion 26 by a retaining ring 30.

The motor 14 includes a rotor member 32 extending from one end and drivably engaged to one end of a rotatable driving spindle 34. The end of the driving spindle 34 opposite the end connected to the rotor member 32 is formed as the sun gear 36 of a planetary gear set generally designated by the numeral 38. The spindle 34 is also adapted to support a driving member 40 of a torque responsive clutch 42. The driving clutch member 40 and spindle 34 are drivably engaged by interfitting ball keys 44 which provide for axial movement of the driving clutch member 40 with respect to the spindle but which prevent relative rotation between the spindle and the driving clutch member. The spindle 34 also supports a driven clutch member 46 on a suitable bearing 48 to provide for relative rotation of the spindle with respect to the driven clutch member when the driving and driven clutch members are disengaged one from the other.

Figure 4:
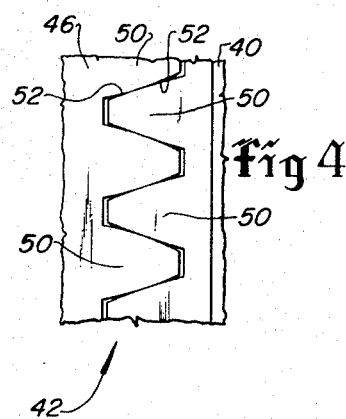
FIG. 4 is a detail view of the toothed clutch members of the torque responsive clutch.

The torque responsive clutch 42 is of a type generally well known in which, as shown in FIG. 4, the driving and driven members 40 and 46 each include axially projecting teeth 50 which are interengaged along sloping surfaces 52. The interengaging teeth 50 comprise means responsive to the transmission of torque from the driving to the driven member for producing a force tending to axially separate the two clutch members. In the embodiment shown the driving member 40 moves axially to disengage from the driven member 46. A coil spring 54 surrounding the spindle 34 biases the driving member 40 into engagement with the driven member 46. The force exerted by the spring 54 determines the torque value required to cause relative movement between the clutch members. The spring 54 is supported by a washer 56 which engages a thrust bearing 58 to provide for rotation of the spring with the spindle and driving clutch member.

Figure 2:
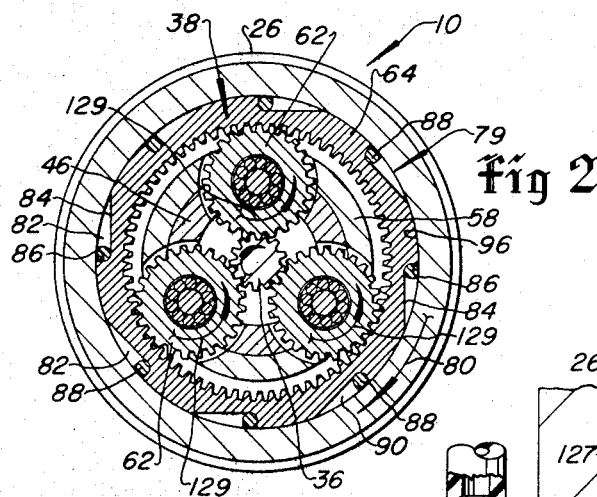
FIG. 2 is a transverse section taken along the line 2—2 of FIG. 1.

Referring to FIGS. 1 and 2, the driven clutch member 46 is connected to a planet gear carrier 58 by a pin 60. The clutch member 46 may also, of course, be formed as an integral part of the carrier 58. The planet gear carrier 58 rotatably supports a plurality of planet gears 62 which are drivably engaged with the sun gear 36 and with an internally toothed ring gear 64. The planet carrier 58 also includes an axially projecting portion forming a driven spindle 66 which comprises a sun gear for a second planetary gear set generally designated by the numeral 68. The second planetary gear set 68 includes a planet gear carrier 70 rotatably supporting a plurality of planet gears 72, one shown. The second planetary gear set 68 also includes a stationary ring gear 74. The planet gear carrier 70 includes a spindle portion 76 supported in a suitable bearing 78 which is mounted in the housing portion 28. The spindle portion 76 may be suitably connected to a rotatable member, not shown, having a wrench socket or the like connected thereto in a known manner.

Figure 5:
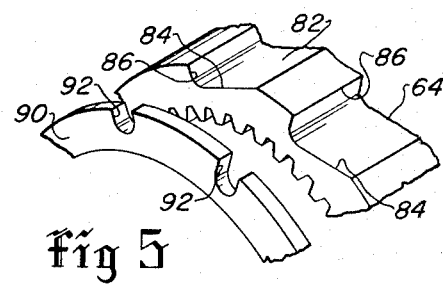
FIG. 5 is a fragmentary view of the members comprising the one way clutch means.

The ring gear 64 is provided with one-way clutch means, generally designated by the numeral 79, providing for unidirectional rotation of the ring gear in the direction indicated by the arrow 80 in FIG. 2. As shown in FIG. 2 and FIG. 5 the exterior circumference of the ring gear 64 is provided with spaced axially extending recesses 82 each having a radially sloping surface 84, and an abrupt edge 86. Cylindrical rollers 88 are disposed in each of the recesses and are engaged at each end by cylindrical washers 90, FIG. 1, each having U-shaped notches 92 for holding the rollers 88. The washers 90 are disposed adjacent each transverse end face of the ring gear 64 for limited rotational movement with respect to the ring gear. Circular retaining washers 94 are disposed adjacent each washer 90 to to prevent axial displacement of the rollers 88 from the recesses 82.

The one-way clutch means 79 operates in a generally well known way to provide for unidirectional rotation of the ring gear 64. The rollers 88 are so proportioned that when the ring gear 64 is rotated in the direction indicated by the arrow 80 the rollers each engage the abrupt edges 86 and undergo rotational and sliding motion with respect to the cylindrical bearing surface 96 on the casing portion 26. However, if the ring gear 64 is rotated in the opposite direction the rollers 88 move up the sloping surfaces 84 until they are wedgingly engaged with the sloping surfaces and the cylindrical bearing surface 96 thereby forcing the ring gear to become rotatably locked with respect to the casing portion 26.

Figure 3:
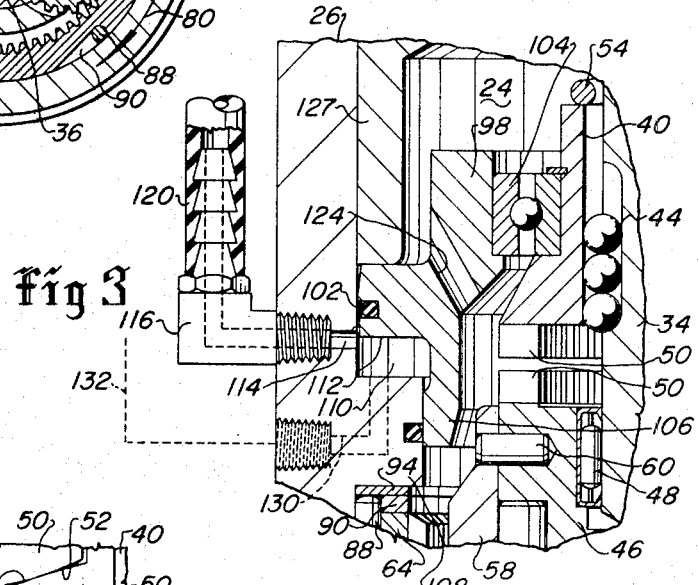
FIG. 3 is a detail view of the piston and torque responsive clutch in the disengaged position.

Referring to FIGS. 1 and 3 the speed shift device of the present invention is further characterized by a member 98 comprising a piston sealingly engaged with an inner wall surface 100 of the casing portion 26 by means of a seal ring member 102. The piston 98 is mounted on the driving clutch member 40 and is supported by a ball bearing assembly 104 providing for rotation of the driving clutch member 40 with respect to the piston. The piston 98 is, however, mounted to be axially movable with the driving clutch member 40 in response to the disengaging action of the torque responsive clutch 42. The piston 98 includes an axially projecting portion 106 which is sealingly engaged with an O-ring disposed in a reduced diameter wall portion 108 of the housing portion 26.

The piston 98 together with the casing portion 26 forms an expansible chamber 110 into which pressure fluid may be admitted to act on the piston face 112 to rapidly and forcibly complete the disengagement of the driving clutch member 40 from the driven clutch member 46. As shown in FIG. 1 when the clutch member 40 is fully engaged with the driven clutch member 46 the piston is positioned such that the seal ring 102 is disposed between the expansible chamber 110 and a pressure fluid inlet port 114 located in the casing portion 26. The port 114 is in communication with the motor inlet passage 16 through suitable conduit means comprising the fittings 116 and 118, an interconnecting tube 120 and a passage 122 in the casing 12. When the driving clutch member 40 begins to move axially to disengage from the drive clutch member 46 the piston 98 moves to place the port 114 in communication with the chamber 110 providing for pressure fluid to flow into the chamber to act on the piston face 112. Pressure fluid acting on the piston face 112 results in rapid and positive disengagement of the clutch 42 as long as pressure fluid is supplied to the chamber 110. The disengagement of the clutch 42 provides for reducing the speed of the spindle 66 with respect to the driving spindle 34 as will be explained by a description of an operating cycle of the tool 10.

In the embodiment shown in FIG. 1, prior to commencing an operating cycle, the clutch 42 will be engaged and the motor 14 will be operative to rotate the spindle 34 and planet carrier 58 in the direction of the arrow 80, FIG. 2. With pressure fluid supplied to the motor 14 by opening the valve 20 to position b the spindle 34, planet gear carrier 58, and ring gear 64 will be locked together to rotate at the same speed. Accordingly, the driven spindle 66 will be rotating at the same speed as the driving spindle 34. Pressure fluid is also supplied to the port 114 but the port is blocked by the seal ring 102 from admitting pressure fluid to the expansible chamber 110. Exhaust fluid leaving the motor 14 is conducted through the casing interior 24, passage 124 in the piston, through the planetary gear sets 38 and 68 to a passage 126 in the casing portion 28 and through a muffler 128 to the exterior of the tool 10. When the turque exerted by the motor 14 reaches a predetermined value due to resistance to rotation of the spindle 76 the driving clutch member 40 will begin to move axially away from the driven clutch member 46. This movement will cause the piston seal ring 102 to pass over the fluid inlet port 114 providing for pressure fluid to be admitted to the chamber 110. Pressure fluid acting on the piston face 112 will cause rapid and complete disengagement of the clutch members 40 and 46 without any tendency for the interengaging teeth 50 to clash or slip over each other. Axial movement of the piston and clutch member 40 is limited by engagement of the piston with the spacer 127 located in the casing portion 26.

Upon disengagement of the clutch 42 the planet gear carrier 58 will no longer be locked to rotate at the speed of the spindle 34. The sun gear 36 will, in fact, rotate the gears 62 about their respective axes in the direction of the arrows 129, FIG. 2, and the ring gear 64 will react to the rotation of the planet gears 62 by trying to rotate in a direction opposite to that of the arrow 80. However, the one-way clutch means 79 will prevent rotation of the ring gear 64 in the direction opposite to the arrow 80 and, accordingly, the planetary gear set 38 will become operative to rotate the spindle 66 at the rotary speed of the planet carrier 58 which, with the ring gear locked, is less than the speed of the spindle 34. Accordingly, the speed of the driven spindle 66 and the tool spindle 76 will be reduced and the output torque increased to drive a fastener to a final torque value in accordance with a suitable torque control device or by stalling the motor 14. When the final torque value has been reached the valve 20 will be released to close to position a and the chamber 110 will be vented through the port 114 and connecting passages, through the motor 14, and the aforementioned motor exhaust passages. With the expansible chamber 110 relieved of fluid pressure the spring 54 will move the driving clutch member 40 to reengage the driven clutch member 46 and the piston 98 will move to block the fluid inlet port 114 to complete an operating cycle of the tool.

Referring to FIG. 3, an alternate position for the fluid inlet port is shown by dashed lines and is generally designated by the numeral 130. The fluid inlet port 130 is always in communication with the expansible chamber 110 regardless of the position of the piston 98. With the arrangement of the fluid inlet port 130 pressure fluid is supplied through a conduit 132 to the expansible chamber 110 and may be controlled independent of the operation of the valve 20. An example of such independent control would be the operation of a multiple tool arrangement using a plurality of tools 10 to simultaneously or in a predetermined sequence tighten a plurality of fasteners. In such an arrangement the clutch spring 54 of each tool would be modified to provide a sufficient bias force to prevent disengagement of the clutch 42 until the motor 14 was stalled. When all tools of the multiple tool arrangement had stalled their respective motors a suitable control signal would provide for pressure fluid to be admitted to the chamber 110 of each tool to disengage each clutch whereby each tool motor would be able to further tighten its respective fastener to a final torque. Such a mode of operation is often desirable for multiple tool arrangements to assure uniform clamping forces to be exerted by all fasteners in certain types of plural fastener connections.

What is claimed is:

1. In a fluid operated tool for tightening threaded fasteners and the like:
   a casing;
   a motor disposed in said casing;
   a driving spindle drivably connected to said motor;
   a driven spindle;
   a speed shift device interconnecting said driving and driven spindles and operable to reduce the speed of said driven spindle with respect to said driving spindle, said device including a clutch having driving and driven members movable, one member with respect to the other member, to disengage said clutch and cause said speed shift device to reduce the speed of said driven spindle, said clutch including means forming interengagement of said driving and driven members and responsive to a predetermined torque being transmitted from said driving member to said driven member for moving said one member with respect to said other member;
   a piston connected to said one member for movement therewith, said piston being disposed in said casing to form an expansible chamber; and,
   an inlet port for admitting pressure fluid to said expansible chamber in response to movement of said one member to act on said piston to disengage said clutch.

2. The invention set forth in claim 1 wherein:
   said inlet port is cooperable with said piston to be in communication with said expansible chamber in response to movement of said piston for admitting pressure fluid to said expansible chamber to act on said piston to disengage said clutch.

3. The invention set forth in claim 2 wherein:
   said driving member is connected to said driving spindle and said piston, and said driving member is movable in response to a predetermined torque transmitted by said clutch to move said piston to admit pressure fluid to said expansible chamber.

4. The invention set forth in claim 3 wherein:
   said driven member is connected to said driven spindle for rotating said driven spindle at the speed of said driving spindle when said clutch is engaged.

5. The invention set forth in claim 4 wherein:
   said speed shift device includes a planetary gear set including a sun gear, planetary gear means engaged with said sun gear and mounted on a planetary gear carrier, and said planetary gear carrier is interconnected between said driven member and said driven spindle for driving said driven spindle at the speed of said driving spindle when said clutch is engaged.

6. The invention set forth in claim 5 wherein:
   said sun gear is connected to said driving spindle for rotation with said driving spindle.

7. The invention set forth in claim 6 wherein:
   said planetary gear set includes a ring gear engaged with said planetary gear means and rotatable with said planetary gear carrier when said clutch is engaged.

8. In a fluid operated tool for tightening threaded fasteners and the like:
   a casing;
   a motor disposed in said casing;
   a driving spindle drivably connected to said motor;
   a driven spindle;
   a speed shift device comprising a planetary gear set having a sun gear connected to said driving spindle for rotation therewith, a planetary gear carrier connected to said driven spindle, planetary gear means mounted on said carrier and engaged with said sun gear, and a ring gear engaged with said planetary gear means;
   said speed shift device including a clutch having driving and driven members movable, one member with respect to the other member, to disengage said clutch, said clutch members being arranged for rotating said driven spindle at the speed of said driving spindle when said clutch is engaged, a piston disposed in said casing to form an expansible chamber, said piston being connected to one of said clutch members for moving said one clutch member with respect to said other clutch to disengage said clutch;

a fluid inlet port for admitting pressure fluid to said expansible chamber to act on said piston to disengage said clutch; and, one way clutch means mounted in said casing and engaged with said ring gear to provide for rotation of said ring gear when said clutch is engaged and to prevent rotation of said ring gear when said clutch is disengaged to reduce the speed of said driven spindle with respect to said driving spindle.

9. In a fluid operated tool for tightening threaded fasteners and the like:

a casing;

a motor disposed in said casing;

a driving spindle drivably connected to said motor;

a driven spindle;

a speed shift device comprising a planetary gear set having a sun gear connected to said driving spindle for rotation therewith, a planetary gear carrier connected to said driven spindle, planetary gear means mounted on said carrier and engaged with said sun gear, and a ring gear engaged with said planetary gear means;

said speed shift device including a clutch having a driving member connected to said driving spindle, a driven member drivably connected to said carrier for rotating said carrier and said driven spindle at the speed of said driving spindle when said clutch is engaged, a piston disposed in said casing to form an expansible chamber, said piston being connected to said driving member, and said clutch includes means responsive to a predetermined torque transmitted from said driving member to said driven member for moving said driving member and said piston with respect to said driven member;

a fluid inlet port cooperable with said piston to be in communication with said expansible chamber in response to movement of said dirving clutch member for admitting pressure fluid to act on said piston to disengage said clutch; and, one way clutch means mounted in said casing and engaged with said ring gear to provide for rotation of said ring gear when said clutch is engaged and to prevent rotation of said ring gear when said clutch is disengaged to reduce the speed of said driven spindle with respect to said driving spindle.

* * * * *